3,398,187
DERIVATIVES OF ACETIC ACID
David John Drain, Welwyn Garden City, England, assignor to T. J. Smith & Nephew Limited, Kingston-upon-Hull, England
No Drawing. Filed Aug. 30, 1965, Ser. No. 483,856
Claims priority, application Great Britain, Sept. 8, 1964, 36,691/64; Dec. 22, 1964, 51,971/64; Mar. 31, 1965, 13,538/65
6 Claims. (Cl. 260—519)

ABSTRACT OF THE DISCLOSURE

Aryloxyacetic acid and arylthioacetic acid derivatives having analgesic, anti-inflammatory and anti-pyretic properties and of low toxicity and having the general formula

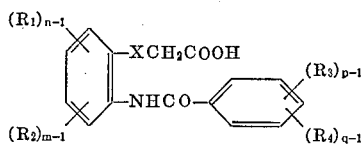

in which $R_1$, $R_2$, $R_3$ and $R_4$ are alkyl radicals having from 1 to 4 carbon atoms, alkoxyl radicals having from 1 to 4 carbon atoms, the hydroxyl radical, halogen atoms, the trifluoromethyl radical, the nitro radical, alkylsulphonyl radicals having from 1 to 4 carbon atoms, and the fused-on benzene ring; X is oxygen or sulphur; and $n$, $m$, $p$ and $q$ are 1 or 2. Representative compounds include 2-(3',4'-dichlorobenzamido)-phenoxyacetic acid, 2-(3',4'-dichlorobenzamido)-4-methylphenoxyacetic acid, and 2-benzamido-4-chlorophenoxyacetic acid. Compounds of this invention are prepared by alkaline hydrolysis of the corresponding dihydrobenzoxazinone or dihydrobenzthiazinone to produce a salt of phenoxyacetic acid or phenylthioacetic acid which is then reacted with a reactive derivative of an aromatic carboxylic acid.

---

This invention relates to derivatives of acetic acid, more particularly to derivatives of an aryloxyacetic acid and arylthioacetic acid, and to a process for their preparation.

One object of the invention is to provide compounds having analgesic, anti-inflammatory and anti-pyretic properties. Another object is to provide new derivatives of aryloxyacetic acid and arylthioacetic acid. Another object is to provide benzamido and substituted-benzamido derivatives of phenoxyacetic acid and of substituted phenoxyacetic acids and of phenylthioacetic acid and of substituted phenylthioacetic acids having analgesic, anti-inflammatory and anti-pyretic properties.

It has been found, according to this invention that compounds having the general formula:

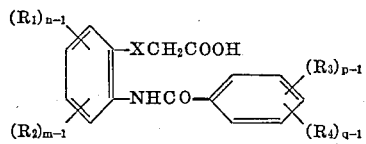
I in which:

$R_1$ and $R_2$ are selected from the group consisting of alkyl radicals having from 1 to 4 carbon atoms, alkoxyl radicals having from 1 to 4 carbon atoms, the hydroxyl radical, halogen atoms, the trifluoromethyl radical, the nitro radical, alkylsulphonyl radicals having from 1 to 4 carbon atoms and the fused-on benzene ring, $R_3$ and $R_4$ are selected from the group consisting of alkyl radicals having from 1 to 4 carbon atoms, alkoxyl radicals having from 1 to 4 carbon atoms, the hydroxyl radical, halogen atoms, the trifluoromethyl radical, the nitro radical, alkylsulphonyl radicals having from 1 to 4 carbon atoms and the fused-on benzene ring, X represents a divalent atom selected from the group which consists of oxygen and sulphur, and $n$, $m$, $p$ and $q$ represent positive integers of from 1 to 2, can be made and have analgesic, anti-inflammatory and anti-pyretic properties and are of low toxicity.

Alkyl groups which $R_1$, $R_2$, $R_3$ and $R_4$ may represent are methyl, ethyl, n-propyl, isopropyl, n-butyl, isobutyl and tert-butyl. Alkoxyl groups which $R_1$, $R_2$, $R_3$ and $R_4$ may represent are methoxyl, ethoxyl, n-propoxyl, isopropoxyl, n-butoxyl, isobutoxyl and tert-butoxyl. When $R_1$, $R_2$, $R_3$ and $R_4$ represent halogen, this may be fluorine, chlorine, bromine or iodine.

Preferred compounds having the above general Formula I include 2-(3',4'-dichlorobenzamido)-phenoxyacetic acid, 2-(3',4'-dichlorobenzamido)-4-methylphenoxyacetic acid, and 2-benzamido-4-chlorophenoxyacetic acid.

Except when $R_1$ combines with $R_2$ to form a fused-on benzene ring or $R_3$ combines with $R_4$ to form a fused-on benzene ring the meaning of any one of the symbols $R_1$, $R_2$, $R_3$ and $R_4$ in any one molecule is independent of the meaning of any of the other symbols. Subject to the above exception in any one molecule in which $R_1$, $R_2$, $R_3$ and $R_4$ are present they may all represent the same substituent or they may each represent a different substituent. These two possibilities are the extremes; compounds of general Formula I are possible in which $R_1$, $R_2$, $R_3$ and $R_4$ are present and in which two or three of these symbols have the same meaning.

Again subject to the exception set out above the value of any one of the symbols $m$, $p$, $q$ or $n$ is also independent of the value of any of the other symbols.

The present invention also provides a method of preparing a compound of general Formula I above which comprises hydrolysing under alkaline conditions a dihydrobenzoxazinone or a dihydrobenzthiazinone having the general formula:

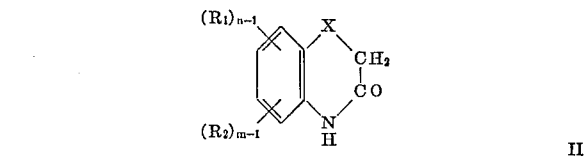
II in which $R_1$, $R_2$, X, $n$ and $m$ are as defined above, to produce a salt of a phenoxyacetic acid or a phenylthioacetic acid having the general formula:

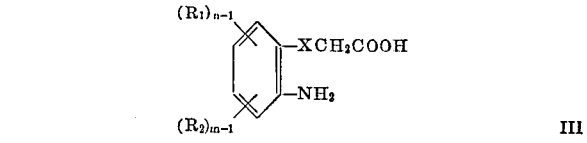
III and reacting this salt with a reactive derivative of a carboxylic acid having the general formula:

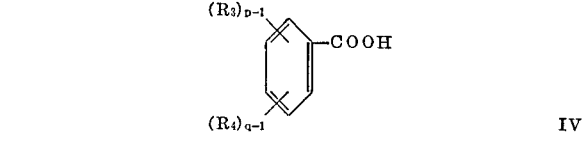
IV in which $R_3$, $R_4$, $p$ and $q$ are as defined above, and isolating the compound of general Formula I.

Preferred reactive derivatives of the carboxylic acid (IV) are the halides, particularly the chloride, and the anhydride.

The invention will be further described with reference to any one of the following examples. Preparations are given for those compounds not previously described in the literature.

Example 1.—2-benzamidophenoxyacetic acid 2,3-dihydro-1,4-benzoxazin-3-one (8.1 g.) was boiled under reflux for one hour with sodium hydroxide (10.5 g.) in water (50 ml.). To the solution was added acetic acid (9 g.) and the solution cooled to 0° C. Benzoyl chloride (7.65 g.) was added over 10 mins. to the cold solution with vigorous stirring, and stirring continued a further 90 mins. The solution was filtered from a small amount of solid and acidified with hydrochloric acid to yield an oil which soon solidified. The solid (13.5 g. M.P. 150° C.) was recrystallised from dibutyl ether (250 ml.) to give colourless crystals (9.12 g.) M.P. 164–165° C.

Found, percent: C, 66.9; H, 4.9; N, 5.2. $C_{15}H_{13}NO_4$ requires, percent: C, 66.4; H, 4.8; N, 5.2.

Example 2.—2-m-chlorobenzamidophenoxyacetic acid 2,3-dihydro-1,4-benzoxazin-3-one (10 g.) was boiled under reflux with sodium hydroxide (12 g.) in water (60 ml.) for 90 minutes. Acetic acid (8.8 ml.) in water (100 ml.) was added and the solution cooled to 0° C. and treated dropwise over 20 minutes with m-chlorobenzoylchloride (11.8 g.) in ether (40 ml.) with vigorous stirring. After one hour the aqueous layer was separated, washed with ether and acidified with hydrochloric acid to yield a solid (15 g.) M.P. 152–157° C. Recrystallisation from dibutyl ether (200 ml.) yielded colourless crystals (12.5 g.) M.P. 161° C.

Found, percent: C, 58.5; H, 3.9; N, 4.6. $C_{15}H_{12}ClNO_4$ requires, percent: C, 58.9; H, 3.9; N, 4.6.

Example 3.—2-o-chlorobenzamidophenoxyacetic acid

This was prepared from 2,3-dihydro-1,4-benzoxazin-3-one and o-chlorobenzoylchloride by the method of Example 2. The product formed colourless crystals M.P. 143–144° C. from ethyl acetate.

Found, percent: C, 59.15; H, 4.1; N, 4.6. $C_{15}H_{12}ClNO_4$ requires, percent: C, 58.9; H, 3.9; N, 4.6.

Example 4.—2-p-chlorobenzamidophenoxyacetic acid 2,3-dihydro-1,4-benzoxazin-3-one (10 g.) was boiled under reflux with sodium hydroxide (12 g.) in water (60 ml.) for 90 minutes. Acetic acid (8.8 ml.) in water (60 ml.) was added, the solution cooled to 0° C. and treated dropwise with p-chlorobenzoylchloride (8 ml.) with vigorous stirring. After one hour, much of the product had separated as a sparingly soluble sodium salt which was removed by filtration, dissolved in ethanol (200 ml.), acidified with hydrochloric acid and diluted with water (300 ml.) to precipitate the free acid. A further quantity was obtained by acidification of the original aqueous alkaline solution.

The combined solids (14.3 g. M.P. 195–205° C.) were recrystallised from dibutyl ether from which the product separated as colourless crystals M.P. 215° C.

Found, percent: C, 58.7; H, 4.0; N, 4.5. $C_{15}H_{12}ClNO_4$ requires, percent: C, 58.9; H, 3.9; N, 4.6.

Example 5.—2-(o-methoxybenzamido)phenoxyacetic acid

This was prepared by the method of Example 1 from 2,3-dihydro-1,4-benzoxazin-3-one and o-methoxybenzoylchloride. The product, after three recrystallisations from dibutyl ether formed colourless crystals, M.P. 174–175° C.

Found, percent: C, 63.7; H, 5.0; N, 4.9. $C_{16}H_{15}NO_5$ requires, percent: C, 63.8; H, 5.0; N, 4.7.

Example 6.—2-benzamido-4-chlorophenoxyacetic acid 6-chloro-2,3-dihydro-1,4-benzoxazin-3-one (8.2 g.) was boiled under reflux for 1½ hours with sodium hydroxide (10.5 g.) in water (50 ml.). Acetic acid (10 g.) was added and the solution cooled to 0° C., stirred vigorously and benzoylchloride (6.3 g.) added dropwise over 10 minutes. After stirring one hour, water (150 ml.) was added and the suspension acidified with hydrochloric acid the solid (12.5 g.) was recrystallised from dibutyl ether to yield colourless crystals (9.0 g.) M.P. 166–167° C.

Found, percent: C, 59.0; H, 4.0; N, 4.6. $C_{15}H_{12}ClNO_4$ requires, percent: C, 58.9; H, 3.9; N, 4.6.

Example 7.—4-chloro-2-(p-chlorobenzamido)-phenoxyacetic acid

This was prepared from 6-chloro-2,3-dihydro-1,4-benzoxazin-3-one and p-chlorobenzoylchloride by the method of Example 4. The product formed colourless crystals, M.P. 164° C. from dibutyl ether.

Found, percent: C, 53.0; H, 3.4; N, 4.05. $C_{15}H_{11}Cl_2NO_4$ requires, percent: C, 52.9; H, 3.2; N, 4.1.

Example 8.—4-chloro-2-(p-methoxybenzamido)phenoxyacetic acid 6-chloro-2,3-dihydro-1,4-benzoxazin-3-one (14.6 g.) was boiled under reflux for 1¼ hours with sodium hydroxide (14 g.) in water (75 ml.). Acetic acid (10.1 ml.) in water (175 ml.) was added and the solution cooled to 0° C., stirred vigorously, and p-methoxybenzoylchloride (10.8 ml.) in ether (75 ml.) added over 10 minutes. After 1½ hours the suspension was filtered, the solid discarded and the aqueous layer washed with ether, separated and acidified with hydrochloric acid to yield a yellow solid, M.P. 140° C. After three recrystallisations from dibutyl ether, the product formed colourless crystals, M.P. 195° C.

Found, percent: C, 57.0; H, 4.2; N, 4.2. $C_{16}H_{14}Cl_2O_5N$ requires, percent: C, 57.3; H, 4.2; N, 4.2.

Example 9.—2-benzamidophenylthioacetic acid 2,3-dihydro-1,4-benzothiazin-3-one (9.7 g.) was boiled under reflux for 1¼ hours with sodium hydroxide (12 g.) in water (60 ml.). Acetic acid (9.7 ml.) in water (100 ml.) was added and the solution cooled to 0° C., stirred vigorously and benzoyl chloride (7 ml.) added dropwise over 10 minutes. After one hour much of the product had separated, as a sparingly soluble sodium salt which was filtered off, dissolved in ethanol (150 ml.), acidified with hydrochloric acid and diluted with water (300 ml.) to yield a colourless solid. A further quantity was obtained by acidification of the original alkaline aqueous liquors. Total yield 15 g. The combined solids were recrystallised twice from dibutyl ether to yield colourless needles, M.P. 194–195° C.

Found, percent: C, 62.6; H, 4.6; N, 4.9. $C_{15}N_{13}NO_3S$ requires, percent: C, 62.7; H, 4.5; N, 4.9.

Example 10.—2-(p-chlorobenzamido)-phenylthioacetic acid

This was prepared from 2,3-dihydro-1,4-benzothiazin-3-one and p-chlorobenzoylchloride by the method of Example 9. After three recrystallisations from isopropanol the product formed colourless crystals M.P. 183–185° C.

Found, percent: C, 56.3; H, 3.9; N, 4.25. $C_{15}H_{12}ClNO_3S$ requires, percent: C, 56.0; H, 3.7; N, 4.35.

Example 11.—2-(3′,4′-dichlorobenzamido)-phenoxyacetic acid 2,3-dihydro-1,4-benzoxazin-3-one (14.9 g.:0.1 M) was boiled under reflux with aqueous sodium hydroxide (100 ml. of 5 N:0.5 M) for 90 minutes. Water (100 ml.) was added, followed by dilute hydrochloric acid (80 ml. of 5 N:0.4 M). The solution of sodium 2-aminophenoxyacetate was cooled to 5–10° C. with stirring and a solution of 3,4-dichlorobenzoylchloride (21 g.:0.11 M) in ether (100 ml.) added over 60 minutes. During this addition the pH of the solution was maintained at 7–9 by the simultaneous dropwise addition of aqueous sodium hydroxide (22 ml. of 5 N:0.11 M). The mixture was stirred a further 2 hours, the ether layer separated and the aqueous phase filtered to remove a small amount of solid. The aqueous filtrate was acidified with dilute sulphuric acid and the pale cream solid filtered, washed well with water and dried at 60° C. Yield 32.6 g. (96%); M.P. 204–210° C.

After two recrystallisations from ethyl acetate 2-(3',4'-dichlorobenzamido)-phenoxyacetic acid formed colourless needles, M.P. 218–219° C.

Found, percent: C, 52.95; H, 3.44; N, 4.33.

$$C_{15}H_{11}Cl_2NO_4$$

requires, percent: C, 52.94; H, 3.24; N, 4.12.

Example 12.—4-chloro-2-(3'-trifluoromethylbenzamido)-phenoxyacetic acid 6-chloro-2,3-dihydro-1,4-benzoxazin-3-one (9.18 g.:0.05 M) was boiled under reflux for 90 minutes with aqueous sodium hydroxide (50 ml. of 5 N:0.25 M). Water (50 ml.) was added, followed by dilute hydrochloric acid (40 ml. of 5 N:0.2 M). The solution was stirred and cooled to 10° C. and a solution of m-trifluoromethylbenzoyl chloride (10.42 g.:0.05 M) in ether (50 ml.) added over 60 minutes. During this addition, the temperature was maintained at 10° C., and the solution kept at pH 7–9 by the simultaneous addition of aqueous sodium hydroxide (10 ml. of 5 N:0.05 M). The mixture was stirred a further one hour, diluted with water (100 ml.) and the ether layer separated. The aqueous layer was filtered to remove a small amount of solid and acidified to pH 3 with dilute hydrochloric acid. The pale yellow solid was collected by filtration, washed well with water and dried. Yield 14.6 g.; M.P. 155–156° C.

After recrystallisation from dibutyl ether followed by recrystallisation from 60% ethanol, 4-chloro-2(3'-trifluoromethyl-benzamido) phenoxyacetic acid formed colourless needles, M.P. 159–160° C.

Found, percent: C, 51.41; H, 3.02; N, 4.12.

$$C_{16}H_{11}ClF_3NO_4$$

requires, percent: C, 51.40; H, 2.95; N, 3.75.

Example 13.—2-(3',4'-dichlorobenzamido)-4-methoxyphenoxyacetic acid 2,3-dihydro-6-methoxybenz-1,4-oxazin-3-one (8.95 g.:0.05 M) was boiled under reflux for 2 hours with aqueous sodium hydroxide (50 ml. of 5 N:0.25 M). Water (50 ml.) was added followed by dilute hydrochloric acid (40 ml. of 5 N:0.2 M) and the solution was cooled to 10° C. with stirring. A solution of 3,4-dichlorobenzoylchloride (10.47 g.:0.05 M) in ether (50 ml.) was added over a period of 90 minutes, maintaining the temperature at 10° C. and the pH between 7 and 9 by the simultaneous addition of aqueous sodium hydroxide (10 ml. of 5 N:0.05 M). During the course of the reaction, the sodium salt precipitated and a further 150 ml. water was added to facilitate stirring. After a further one hour, the sodium salt was filtered off, dissolved in 50% acetone (150 ml.) by warming and acidified to pH 3 with dilute hydrochloric acid. The solid was filtered, washed well with water and dried at 60° C. Yield 13.2 g.; M.P. 182–187° C.

Two recrystallisations from ethyl methyl ketone gave 2-(3',4'-dichlorobenzamido)-4-methoxyphenoxyactic acid as colourless needles, M.P. 196–197° C.

Found, percent: C, 52.01; H, 3.67; N, 4.01.

$$C_{16}H_{13}Cl_2NO_5$$

requires, percent: C, 51.89; H, 3.51; N, 3.78.

Example 14.—2-benzamido-4-methylphenoxyacetic acid 6-methyl-2,3-dihydrobenz-1,4-oxazin-3-one (7.5 g.:0.046 M) was boiled under reflux for 2 hours with aqueous sodium hydroxide (46 ml. of 5 N:0.23 M). After cooling, water (46 ml.) was added, followed by dilute hydrochloric acid (37 ml. of 5 N:0.184 M) and the solution cooled to 10° C. with stirring. A solution of benzoyl chloride (6.5 g.:0.046 M) in ether (50 ml. ) was added over 60 minutes, maintaining temperature at 10° C. and pH between 7 and 9 by the simultaneous addition of aqueous sodium hydroxide (9.2 ml. of 5 N:0.046 M).

After a further one hour the ether layer was separated and the aqueous layer acidified with dilute hydrochloric acid to give a solid which was filtered off. Yield 11.88 g. (90%).

After several recrystallisations from ethyl acetate, 2-benzamido-4-methylphenoxyacetic acid formed colourless crystals, M.P. 147–148° C.

Found, percent: C, 67.27; H, 5.56; N, 5.00. $C_{16}H_{15}NO_4$ requires, percent: C, 67.4; H, 5.26; N, 4.92.

Example 15.—4-bromo-2-(4'-chlorobenzamido)-5-methylphenoxyacetic acid 6-bromo-2,3-dihydro-7-methylbenz-1,4-oxazin-3-one (4.0 g.:0.0164 M) was boiled under reflux with aqueous sodium hydroxide (41 ml. of 4 N:0.164 M) for 3 hours. After cooling and dilution with water (160 ml.), dilute hydrochloric acid (37 ml. of 4 N:0.147 M) was added and the suspension cooled, with stirring, to 10° C. A solution of 4-chlorobenzoyl chloride (2.87 g.:0.0164 M) in ether (50 ml.) was added over 60 minutes with stirring, maintaining the temperature at 10° C., and the pH between 8 and 9 by simultaneous addition of aqueous sodium hydroxide (4.1 ml. of 5 N:0.0164 M). After a further one hour the suspension was filtered and the solid dissolved in 50% acetone and acidified with dilute hydrochloric acid to precipitate the free acid. Several recrystallisations from acetone gave 4-bromo-2-(4'-chlorobenbamido)-5-methylphenoxyacetic acid as colourless crystals, M.P. 204–205° C.

Found, percent: C, 47.9; H, 3.16; N, 3.62.

$$C_{16}H_{13}BrClNO_4$$

requires, percent: C, 48.2; H, 3.26; N, 3.51.

Example 16.—2-(3'4'-dichlorobenzamido) phenylthioacetic acid 2,3-dihydrobenz-1,4-thiazin-3-one (8.25 g.:0.05 M) was boiled under reflux with aqueous sodium hydroxide (50 ml. of 5 N:0.25 M) for 90 minutes. After cooling and dilution with water (50 ml.), dilute hydrochloric acid (40 ml. of 5 N:0.2 M) was added and the solution cooled, with stirring, to 10° C. A solution of 3,4-dichlorobenzoyl chloride (10.5 g.:0.05 M) in ether (50 ml.) was added with stirring over 60 minutes, maintaining the temperature at 10° C. and the pH between 7 and 9 by the simultaneous addition of aqueous sodium hydroxide (10 ml. of 5 N:0.5 M). Finally the solution was stirred a further one hour, the ether layer separated and the aqueous layer acidified to pH 3 with dilute hydrochloric acid to give a gum which soon crystallised. Yield 17.6 g. (99%). After recrystallisation from 50% acetone 2-(3',4'-dichlorobenzamido) phenylthioacetic acid formed colourless crystals, M.P. 170–171° C.

Found, percent: C, 5.31; H, 3.35; N, 4.02.

$$C_{15}H_{11}Cl_2NO_3S$$

requires, percent: C, 50.56; H, 3.09; N, 3.93.

The following compounds were prepared by similar methods:

Example 17.—2-(4'-methylbenzamido)-phenoxyacetic acid

Colourless prisms from ethyl methyl ketone, M.P. 198–198.5° C.

Found, percent: C, 66.86; H, 5.20; N, 4.74; $C_{16}H_{15}NO_4$ requires, percent: C, 67.36; H, 5.26; N, 4.91.

Example 18.—2-(4'-bromobenzamido)-phenoxyacetic acid

Colourless needles, M.P. 210–211° C. from methanol.
Found, percent: C, 51.46; H, 3.71; N, 4.29.

$$C_{15}H_{12}BrNO_4$$

requires, percent: C, 51.44; H, 3.44; N, 4.0.

Example 19.—2-(3'-trifluoromethylbenzamido)phenoxyacetic acid

Colourless crystals, M.P. 160–160.5° C. from ethyl acetate.

Found, percent: C, 56.61; H, 3.60; N, 4.25.

$C_{16}H_{12}F_3NO_4$ requires, percent: C, 56.64; H, 3.54; N, 4.13.

Example 20.—4-chloro-2-(3',4'-dichlorobenzamido)-phenoxyacetic acid

Colourless needles, M.P. 208–209° C. from ethylacetate.

Found, percent: C, 47.94; H, 3.02; N, 3.56.

$C_{15}H_{10}Cl_3NO_4$ requires, percent: C, 48.06; H, 2.67; N, 3.74.

Example 21.—2-(4'-chlorobenzamido)4-methoxyphenoxyacetic acid

Colourless needles, M.P. 163–164° C. from ethylmethyl ketone.

Found, percent: C, 57.17; H, 4.21; N, 4.54.

$C_{16}H_{14}ClNO_5$ requires, percent: C, 57.22; H, 4.17; N, 4.17.

Example 22.—2-(4'-chlorobenzamido)-4-methylphenoxyacetic acid

Colourless crystals; M.P. 174–175° C. from ethylacetate.

Found, percent: C, 60.07; H, 4.69; N, 4.61.

$C_{16}H_{14}ClNO_4$ requires percent: C, 60.2; H, 4.39; N, 4.39.

Example 23.—2-benzamido-4-bromo-5-methylphenoxyacetic acid

Colourless crystals, M.P. 235–236° C. from acetone.

Found, percent: C, 52.48; H, 3.63; N, 4.09.

$C_{16}H_{14}BrNO_4$ requires, percent: C, 52.7; H, 4.04; N, 4.04.

Example 24.—2-(3',5'-dichloro-benzamido)-phenoxyacetic acid 2,3-dihydro-1,4-benzoxazine-3-one (7.45 g.:0.5 M) was boiled under reflux with aqueous sodium hydroxide (50 ml. of 5 N≡0.25 M) for 2 hours. Water (100 ml.) was added, followed by dilute hydrochloric acid (40 ml. of 5 N≡0.2 M). The solution of sodium 2-amino-phenoxyacetate was cooled to 10° C. and a solution of 3,5-dichlorobenzoyl chloride (10.5 g.:0.05 M) in ether (50 ml.) was added dropwise, with stirring over 75 minutes. During the addition the pH of the solution was maintained at 7–9 by the simultaneous dropwise addition of aqueous sodium hydroxide (50 ml. of N≡0.05 mole). The mixture was stirred a further 1 hour, filtered, and the ether layer separated from the filtrate. The aqueous phase was acidified with 30 ml. of 5 N hydrochloric acid, and the colourless precipitate filtered, washed well with water, and dried at 50° C. Yield 16.2 g. (95%) M.P. 230–1° C. One recrystallisation from methyl ethyl ketone (500 ml.) gave colourless needles, M.P. 237.5° C. (12.5 g.:74%).

Found, percent: C, 52.90; H, 3.48; N, 4.40. $C_{15}H_{11}Cl_2NO_4$ requires, percent: C, 52.94; H, 3.23; N, 4.12.

The following compounds were prepared from 2,3-dihydro-1,4-benzoxazine-3-one and the appropriate acid chloride by the same method:

Example 25.—2-(2',4'-dichloro-benzamido)-phenoxyacetic acid

Colourless needles from acetone/water (3:2) M.P. 196° C.

Found, percent: C, 52.70; H, 3.27; N, 4.05. $C_{15}H_{11}Cl_2N_4$ requires, percent: C, 52.94; H, 3.23; N, 4.12.

Example 26.—2-(2',5'-dichloro-benzamido)-phenoxyacetic acid

Colourless needles from di-n-butyl ether, M.P. 188–190.5° C.

Found, percent: C, 52.87; H, 3.21; N, 4.11. $C_{15}H_{11}Cl_2N_4$ requires, percent: C, 52.94; H, 3.23; N, 4.12.

Example 27.—2-(3',4'-dimethyl-benzamido)-phenoxyacetic acid

Colourless needles from acetone/water (1:1), M.P. 163–5° C.

Found, percent: C, 67.96; H, 5.69; N, 4.62. $C_{17}H_{17}NO_4$ requires, percent: C, 68.21; H, 5.73; N, 4.68.

Example 28.—2-(3',4'-dimethoxy-benzamido)-phenoxyacetic acid

Colourless needles from acetone/water (1:1), M.P. 201–202° C.

Found, percent: C, 61.59; H, 5.03; N, 4.44. $C_{17}H_{17}NO_6$ requires, percent: C, 61.63; H, 5.17; N, 4.23.

Example 29.—2-(4'-fluoro-benzamido)-phenoxyacetic acid

Colourless needles from acetone/water (1:1), M.P. 183–184.5° C.

Found, percent: C, 62.64; H, 4.38; N, 4.91.

$C_{15}H_{12}FNO_4$ requires, percent: C, 62.27; H, 4.15; N, 4.88.

Example 30.—2-(4'-iodo-benzamido)-phenoxyacetic acid

Colourless needles from ethanol, M.P. 192–3° C.

Found, percent: C, 45.47; H, 3.15; N, 3.78. $C_{15}H_{12}INO_4$ requires, percent: C, 45.34; H, 3.02; N, 3.53.

Example 31.—2-(3'-bromo-benzamido)-phenoxyacetic acid

Colourless needles from acetone/water, M.P. 158° C.
Found, percent: C, 51.17; H, 3.61; N, 4.07.

$C_{15}H_{12}BrNO_4$ requires, percent: C, 51.42; H, 3.43; N, 4.00.

Example 32.—2-benzamido-4,5-dichloro-phenoxyacetic acid 6,7-dichloro-2,3-dihydro-1,4-benzoxazine-3 - one (7.64 g.:0.035 M) was boiled under reflux with aqueous sodium hydroxide (70 ml. of 5 N≡0.35 M) for 3 hours. The solution of sodium 2-amino-4,5-dichloro-phenoxyacetate was cooled to room temperature, and dilute hydrochloric acid (62 ml. of 5 N) added, with stirring, to bring the pH to 7–8; the mixture was then diluted with acetone (100 ml.) and water (100 ml.). The resultant solution was cooled to 10° C. and a solution of benzoyl chloride (4.9 g.:0.035 M) in acetone (50 ml.) was added dropwise, with stirring, over 1 hour. During the addition the pH of the solution was maintained at 7–9 by simultaneous dropwise addition of aqueous sodium hydroxide solution (35 ml. of 5 N≡0.035 M). The mixture was stirred a further 1 hour, warmed to 25° C., and acidified to pH 5 with 5 N hydrochloric acid, cooled to 3° C. and the solid precipitate filtered and dried. Two recrystallisations from acetone/water (1:1) gave the product as colourless needles, M.P. 240–1° C. (6.48 g.:55%).

Found, percent: C, 53.09; H, 3.25; N, 4.24.

$C_{15}H_{11}Cl_2NO_4$ requires, percent: C, 52.9; H, 3.24; N, 4.12.

The following compounds were prepared from 6,7-dichloro-2,3-dihydro-1,4-benzoxazine-3-one and the appropriate acid chloride by the same method:

Example 33.—2-(4'-chloro-benzamido)-4,5-dichloro-phenoxyacetic acid

Colourless needles from acetone/water (1:1), M.P. 220–1° C.
Found, percent: C, 48.31; H, 2.61; N, 3.96.

$C_{15}H_{10}Cl_3NO_4$ requires, percent: C, 48.1; H, 2.69; N, 3.74.

Example 34.—2-(3',4'-dichloro-benzamido)-4,5-dichloro-phenoxyacetic acid

Colourless needles from methyl ethyl ketone, M.P. 239–40° C.
Found, percent: C, 44.00; H, 2.41; N, 3.39.

$C_{15}H_9Cl_4NO_4$ requires, percent: C, 43.95; H, 2.22; N, 3.42.

Example 35.—2-(3',4'-dichloro-benzamido)-4-methyl-phenoxyacetic acid 2,3-dihydro-6-methyl - 1,4-benzoxazine-3-one (4.89 g.: 0.03 M) was boiled under reflux with aqueous sodium hydroxide (60 ml. of 5 N≡0.3 M) for 3 hours. Water (75 ml.) was added, followed by dilute hydrochloric acid (54 ml. of 5 N≡0.27 M). The solution of sodium 2-amino-4-methyl-phenoxyacetate was cooled to 10° C. and a solution of 3,4-dichlorobenzoyl chloride (6.27 g.: 0.03 M) in acetone (30 ml.) added dropwise, with stirring, over 75 minutes. During the addition the pH of the solution was maintained at 7–9 by simultaneous dropwise addition of aqueous sodium hydroxide (30 ml. of N≡0.03 M). The mixture was stirred a further 1 hour, and then acidified to pH 4 with dilute hydrochloric acid. The precipitate was filtered off, washed with water, dried and recrystallised from acetone/water (1:1) to give the product as colourless needles, M.P. 218–9° C. (5.65 g.:53%).
Found, percent: C, 54.01; H, 3.94; N, 4.18.

$C_{16}H_{13}Cl_2NO_4$ requires, percent: C, 54.24; H, 3.67; N, 3.96.

The following compounds were prepared from the appropriate substituted 2,3-dihydro-1,4-benzoxazine - 3-one and the appropriate acid chloride by the same method:

Example 36.—2-(3',4'-dichlorobenzamido)-5-methyl-phenoxyacetic acid

Colourless needles from acetone/water (3:1), M.P. 233° C.
Found, percent: C, 54.23; H, 3.85; N, 4.06.

$C_{16}H_{13}Cl_2NO_4$ requires, percent: C, 54.24; H, 3.67; N, 3.96.

Example 37.—2-(3',4'-dichloro-benzamido)-4,5-dimethyl-phenoxyacetic acid

Colourless needles from dimethylformamide/water (2.5:1), M.P. 235–6° C.
Found, percent: C, 55.50; H, 4.07; N, 3.95.

$C_{17}H_{15}Cl_2NO_4$ requires, percent: C, 55.44; H, 4.08; N, 3.80.

Example 38.—2-(3',4'-dichloro-benzamido)-4,6-dimethyl-phenoxyacetic acid

Colourless needles from acetone/water (2:1), M.P. 209° C.
Found, percent: C, 55.73; H, 4.27; N, 3.84.

$C_{17}H_{15}Cl_2NO_4$ requires, percent: C, 55.44; H, 4.08; N, 3.80.

Example 39.—2-(3',4'-dichloro-benzamido)-3,5-dimethyl-phenoxyacetic acid

Colourless needles from acetone/water (1:1), M.P. 229–30° C.
Found, percent: C, 55.16; H, 4.00; N, 3.82.

$C_{17}H_{15}Cl_2NO_4$ requires, percent: C, 55.44; H, 4.08; N, 3.80.

Example 40.—2-(3'-trifluoromethyl-benzamido)-4-methyl-phenoxyacetic acid

Colourless needles from acetone/water (1.5:1), M.P. 161° C.
Found, percent: C, 57.98; H, 4.17; N, 4.19.

$C_{17}H_{14}F_3NO_4$ requires, percent: C, 57.79; H, 3.97; N, 3.97.

Example 41.—2-(4'-chlorobenzamido)-5-methoxy-phenoxyacetic acid

Colourless prisms from 1:1 dimethylformamide:water; M.P. 207–8° C.
Found, percent: C, 57.17; H, 4.32; N, 4.22.

$C_{16}H_{14}ClNO_5$ requires, percent: C, 57.23; H, 4.20; N, 4.17.

Example 42.—2-(3',4'-dichlorobenzamido)-5-methoxy-phenoxyacetic acid

Colourless prisms from 1:1 dimethylformamide:water; M.P. 222–3° C.
Found, percent: C, 51.94; H, 3.50; N, 3.84.

$C_{16}H_{13}Cl_2NO_5$ requires, percent: C, 51.64; H, 3.54; N, 3.78.

Example 43.—2-benzamido-4-bromo-phenoxyacetic acid

Colourless needles from di-n-butyl ether; M.P. 167–8° C.
Found, percent: C, 51.68; H, 3.39; N, 3.93.

$C_{15}H_{12}BrNO_4$ requires, percent: C, 51.43; H, 3.43; N, 4.00.

Example 44.—2-(3',4'-dichlorobenzamido)-4-bromo-phenoxyacetic acid

Colourless needles from di-n-butyl ether, M.P. 200–201° C.
Found, percent: C, 43.14; H, 2.45; N, 3.53.

$C_{15}H_{10}BrCl_2NO_4$ requires, percent: C, 42.96; H, 2.39; N, 3.34.

Example 45.—2-(3',4'-dichlorobenzamido)-4-ethyl-phenoxyacetic acid

Colourles needles from 1:1 dimethylformamide:water, M.P. 209–210° C.
Found, percent: C, 55.56; H, 4.04; N, 3.71.

$C_{17}H_{15}Cl_2NO_4$ requires, percent: C, 55.44; H, 4.08; N, 3.80.

Example 46.—2-(3',4'-dichlorobenzamido)-4-tert-butyl-phenoxyacetic acid

Colourless needles from di-n-butyl ether, M.P. 182–183° C.
Found, percent: C, 57.73; H, 4.86; N, 3.64.

$C_{19}H_{19}Cl_2NO_4$ requires, percent: C, 57.58; H, 4.80; N, 3.54.

Example 47.—2-(2'-naphthamido)-phenoxyacetic acid

Colourless needles from 1:1 acetone:water, M.P. 164–5° C.

Found, percent: C, 70.80; H, 4.76; N, 4.33.

$C_{19}H_{15}NO_4$ requires, percent: C, 71.03; H, 4.67; N, 4.36.

Example 48.—2-(4'-nitrobenzamido)-phenoxyacetic acid

Pale yellow needles from acetone; M.P. 198° C.
Found, percent: C, 56.79; H, 3.78; N, 9.10.

$C_{15}H_{12}N_2O_6$ requires, percent: C, 56.96; H, 3.82; N, 8.86.

Example 49.—2-(4'-hydroxybenzamido)-phenoxyacetic acid

Colourless prisms from 1:1 acetone:water; M.P. 162–3° C.
Found, percent: C, 62.75; H, 4.44; N, 4.65.

$C_{15}H_{13}NO_5$ requires, percent: C, 62.71; H, 4.56; N, 4.88.

Example 50.—2-(2'-hydroxybenzamido-)phenoxyacetic acid

Colourless micro-prisms from ethylene dichloride; M.P. 162–3° C.
Found, percent: C, 63.00; H, 4.62; N, 4.73.

$C_{15}H_{13}NO_5$ requires, percent: C, 62.71; H, 4.56; N, 4.88.

Example 51.—2-(4'-methylsulphonylbenzamido)-phenoxyacetic acid

Colourless needles from ethylene dichloride; M.P. 177–8° C.
Found, percent: C, 55.17; H, 4.20; N, 4.22. $C_{16}H_{15}NO_6S$ requires, percent: C, 55.02; H, 4.29; N, 4.01.

Example 52.—2-(3',4'-dichlorobenzamido)-5-hydroxyphenoxyacetic acid

Colourless micro-prisms from methylethyl ketone; M.P. 221–2° C.
Found, percent: C, 50.63; H, 3.16; N, 3.96.

$C_{15}H_{11}Cl_2NO_5$ requires, percent: C, 50.56; H, 3.09; N, 3.93.

Example 53.—2-(3',4'-dichlorobenzamido)-4-hydroxyphenoxyacetic acid

Colourless micro-prisms from dioxane; M.P. 254–5° C.
Found, percent: C, 50.33; H, 3.10; N, 3.98.

$C_{15}H_{11}Cl_2NO_5$ requires, percent: C, 50.56; H, 3.09; N, 3.93.

Example 54.—2-(1-(3',4'-dichlorobenzamido))-naphthoxyacetic acid

Colourless prisms from 2:1 dioxane:water; M.P. 241–2° C.
Found, percent: C, 58.46; H, 3.33; N, 3.59.

$C_{19}H_{13}Cl_2NO_4$ requires, percent: C, 58.18; H, 3.38; N, 3.76.

Preparation I.—2,3-dihydro-6-methoxybenz-1,4-oxazin-3-one (a) 2-chloroacetamido-4-methoxyphenol.—To a solution of 2-amino-4-methoxyphenol (46 g.) in dry acetone (300 ml.), containing triethylamine (33.5 g.), cooled to 0° C., chloroacetyl chloride (37.5 g.) was added dropwise, with stirring, keeping the temperature at 10° C. After 30 minutes, water (50 ml.) was added to dissolve triethylamine hydrochloride and the clear dark solution concentrated to dryness under reduced pressure. Water (1000 ml.) was added and the solid collected by filtration, washed with water and dried. Yield 70.3 g. (98.5%); M.P. 173–176.5° C.

A sample twice recrystallised from 70% ethanol formed pale brown needles; M.P. 183° C.
Found, percent: C, 49.98; H, 5.03; N, 6.64.

$C_9H_{10}ClNO_3$ requires, percent: C, 50.12; H, 4.64; N, 6.5.

(b) 2,3-dihydro-6-methoxybenz-1,4-oxazin-3-one.—2-chloroacetamido-4-methoxyphenol (60 g.) was dissolved in boiling ethanol (420 ml.) and aqueous sodium hydroxide (560 ml. of 1 N) added. The solution was heated 10 minutes on a steam bath and neutralised to pH 7 by the addition of dilute hydrochloric acid (280 ml. of 1 N). After cooling to 0° C., the solid was filtered, washed well with water and dried. Yield 39 g.

Recrystallisation from benzene yielded colourless needles, M.P. 168–169° C.
Found, percent: C, 60.44; H, 5.33; N, 7.73. $C_9H_9NO_3$ requires, percent: C, 60.33; H, 5.03; N, 7.82.

The following compounds were prepared from the appropriately substituted o-aminophenols by the method given under (a) above.

2-chloroacetamido-5-methoxyphenol

Pale buff plates from ethanol, M.P. 158–160° C.
Found, percent: C, 50.18; H, 4.78. $C_9H_{10}ClNO_3$ requires, percent: C, 50.2; H, 4.66.

2-chloroacetamido-4-ethylphenol

Colourless plates from ethanol:water (1:1); M.P. 153–4° C.
Found, percent: C, 56.17; H, 5.72. $C_{10}H_{12}ClNO_2$ requires, percent: C, 56.21; H, 5.62.

2-chloroacetamido-4-tert-butylphenol

Colourless plates from ethanol; M.P. 225–226° C.
Found, percent: C, 59.33; H, 6.79. $C_{12}H_{16}ClNO_2$ requires, percent: C, 59.63; H, 6.63.

The following compounds were prepared by the method given under (b) above.

2,3-dihydro-7-methoxy-1,4-benzoxazin-3-one

Colourless needles from ethyl acetate; M.P. 256–7° C.
Found, percent: C, 60.53; H, 4.96. $C_9H_9NO_3$ requires, percent: C, 60.4; H, 5.03.

2,3-dihydro-6-ethyl-1,4-benzoxazin-3-one

Colourless needles from acetone:water (1:1); M.P. 160–161° C.
Found, percent: C, 67.83; H, 6.02. $C_{10}H_{11}NO_2$ requires, percent: C, 67.80; H, 6.21.

2,3-dihydro-6-tert-butyl-1,4-benzoxazin-3-one

Colourless needles from di-n-butyl ether; M.P. 150–151° C.
Found, percent: C, 70.40; H, 7.71. $C_{12}H_{15}NO_2$ requires, percent: C, 70.24; H, 7.32.

Preparation II.—6-bromo-2,3-dihydro-7-methylbenz-1,4-oxazin-3-one (a) 4-bromo-2-chloroacetamido-5 - methylphenol.—2-amino-4-bromo-5-methylphenol (10.68 g.) in dry acetone (200 ml.) was cooled to 0° C. and chloroacetylchloride (2.0 ml.) added dropwise with stirring over 10 minutes maintaining temperature below 10° C. Aqueous sodium hydroxide (26 ml. of 2 N) was added over 5 minutes, followed by chloroacetyl chloride (2.0 ml.) during 10 minutes. During the whole procedure the temperature was kept below 10° C. The solution was acidified to pH 3 with dilute hydrochloric acid and evaporated to dryness under reduced pressure and the solid residue suspended in water and filtered off. Yield 12.0 g. (82%).

Recrystallisation from ethanol yielded pale brown crystals, M.P. 213–214° C.
Found, percent: C, 38.88; H, 3.42. $C_9H_9BrClNO_2$ requires percent: C, 38.7; H, 3.22.

(b) 6 - bromo - 2,3 - dihydro - 7 - methylbenz - 1,4 - oxazin - 3 - one.—4 - bromo - 2 - chloroacetamido - 5- methylphenol (9.29 g.) was dissolved in ethanol (50 ml.) and water (100 ml.) at 70° C. Aqueous sodium hydroxide (20 ml. of 2 N) was added and the solution heated at 70° C. for ten minutes. The solution was cooled to room temperature and acidified to pH 3 with dilute hydrochloric acid. After cooling to 0° C., the solid was filtered off, washed with water and dried to yield 7.68 g. (95%) of material; M.P. 257° C.

Recrystallisation from ethyl acetate gave colourless needles, M.P. 257° C.

Found, percent: C, 44.7; H, 3.6. $C_9H_8BrNO_2$ requires percent: C, 44.4; H, 3.3.

Preparation III.—2,3 - dihydro - 6,7 - dichloro - 1,4-benzoxazine - 3 - one (a) 2 - chloroacetamido - 4,5 - dichloro - phenol.—2-amino-4,5-dichloro-phenol (5.34 g.: 0.03 M), was dissolved in acetone (100 ml.) and chloroacetyl chloride (1.12 ml.:0.015 M) added dropwise, with stirring at 5–10° C. Aqueous sodium hydroxide solution (15 ml. of 2 N≡0.03 M), was then added, followed by a further quantity of chloroacetyl chloride (1.12 ml.:0.015 M). The total time for the additions was 25 minutes. The solution was allowed to warm to room temperature, and the solvents removed by distillation under reduced pressure, to leave a solid residue (6.9 g.). After 2 recrystallisations from ethanol, the product was obtained as pale buff needles, M.P. 226–7° C.

Found, percent: C, 38.2; H, 2.8. $C_8H_6Cl_3NO_2$ requires percent: C, 37.8; H, 2.4.

(b) The above product (4.0 g.:0.016 M) was dissolved in hot I.M.S. (25 ml.) aqueous sodium hydroxide (22.6 ml. of 2 N≡0.045 M) added, and the mixture heated on the steam bath for 10 minutes. After cooling the mixture was acidified to pH 7 with 5 N hydrochloric acid, and the resultant precipitate filtered off and dried. The pure product was obtained by recrystallisation from methyl ethyl ketone as colourless needles, M.P. 280–2° C. (2.9 g.: 79%).

Found, percent: C, 43.98; H, 2.38. $C_8H_5Cl_2NO_2$ requires percent: C, 44.0; H, 2.29.

The following compounds were obtained from the appropriately substituted o - amino - phenols by a similar method, but without purification of the intermediate chloroacetyl derivatives.

2,3-dihydro-6,7-dimethyl-1,4-benzoxazine-3-one

Colourless needles from ethanol, M.P. 250° C.

Found, percent: C, 68.04; H, 5.93. $C_{10}H_{11}NO_2$ requires percent: C, 67.78; H, 6.26.

2,3-dihydro-6,8-dimethyl-1,4-benzoxazine-3-one

Colourless needles from isopropanol/water (2.5:1), M.P. 188° C.

Found, percent: C, 68.02; H, 6.18. $C_{10}H_{11}NO_2$ requires percent: C, 67.78; H, 6.26.

The compounds were examined for analgesic and anti-inflammatory activity using two biological tests. The first of these (PBQ test) measures the ability of a compound to protect mice from the characteristic "writhing" syndrome produced by i.p. injection of phenylbenzoquinone (Siegmund, Cadmus and Lu., Pro. Soc. Exp. Biol., N.Y. (1957) 95, 729). Results are expressed in two ways:

(a) number of animals protected by a dose equal to two-fifths of the median lethal dose, and
(b) the dose required to produce a 50% reduction in writhing rate ($ED_{50}$).

The second test (carrageenin test) measures the ability of a compound to reduce the swelling produced by injection of carrageenin into the hind paw of the rat (Winter, Risley and Nuss, Proc. Soc. Exp. Biol. N.Y. (1962) 111, 544). Results are given as percent reduction of swelling caused by a dose of 50 mg./kg.

The abbreviation p.o. means per os, that is, administered orally. The abbreviation i.p. means intraperitoneal, that is, administered by injection.

| Compound Example No. | PBQ Test | | $ED_{50}$, mg./kg. p.o. | Carrageenin Test, percent inhibition of swelling caused by 50 mg./kg. i.p. |
|---|---|---|---|---|
| | Dose, mg./kg. p.o. | No. protected/No. tested | | |
| 1 | 400 | 4/12 | | |
| 2 | 400 | 9/12 | 100 | 11 |
| 3 | 400 | 0/12 | | |
| 4 | 400 | 7/12 | 70 | 29 |
| 5 | 400 | 4/12 | | |
| 6 | 240 | 11/12 | 70 | 47 |
| 7 | 280 | 9/12 | 250 | |
| 8 | 400 | 8/12 | 250 | |
| 9 | 400 | 3/12 | | |
| 10 | 400 | 2/12 | | |
| 11 | 400 | 12/12 | 40 | 40 |
| 12 | 400 | 11/12 | 130 | 17 |
| 13 | 400 | 7/12 | | 23 |
| 14 | 400 | 8/12 | | 19 |
| 15 | 300 | 7/12 | | 29 |
| 16 | 400 | 10/12 | | 0 |
| 17 | 400 | 9/12 | | 3 |
| 18 | 400 | 11/12 | 90 | 0 |
| 19 | 400 | 9/12 | | 26 |
| 20 | 400 | 12/12 | 90 | 10 |
| 21 | 400 | 7/12 | | 23 |
| 22 | 300 | 11/12 | | 26 |
| 23 | 400 | 9/12 | | 0 |
| 24 | 400 | 10/12 | | 22 |
| 25 | 400 | 0/6 | | 2 |
| 26 | 400 | | | 0 |
| 27 | 400 | 4/6 | | 4 |
| 28 | 400 | 2/6 | | 0 |
| 29 | 400 | 5/6 | | 43 |
| 30 | 400 | 5/6 | | 0 |
| 31 | 400 | 4/6 | | 0 |
| 32 | 300 | 11/12 | | 17 |
| 33 | 400 | 1/6 | | 8 |
| 34 | 400 | 2/6 | | 0 |
| 35 | 400 | 12/12 | 30 | 45 |
| 36 | 400 | 4/12 | | 53 |
| 37 | 400 | 7/12 | | |
| 38 | 400 | 9/12 | | |
| 39 | 400 | 1/6 | | |
| 40 | 300 | 12/12 | | |
| 41 | 400 | 11/12 | | |
| 42 | 400 | 5/6 | | |
| 43 | 300 | 5/6 | | |
| 44 | 400 | | | |
| 45 | 400 | 6/6 | | |
| 46 | 400 | 5/6 | | |
| 47 | 400 | 4/6 | | 0 |
| 48 | 400 | 3/6 | | 24 |
| 49 | 400 | 1/6 | | |
| 50 | 400 | 4/6 | | |
| 51 | 400 | 1/6 | | |
| 52 | 400 | 0/6 | | |
| 53 | 400 | | | |
| 54 | 400 | 3/6 | | |

The invention has been described in considerable detail with particular reference to preferred embodiments thereof, but it will be understood that variations and modifications can be affected within the spirit and scope of the variation as described hereinabove and as defined in the appended claims.

I claim:
1. A compound having the general formula:

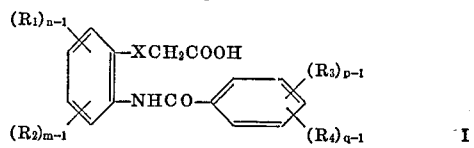

in which:
$R_1$ and $R_2$ are selected from the group consisting of alkyl radicals having from 1 to 4 carbon atoms, alkoxyl radicals having from 1 to 4 carbon atoms, the hydroxyl radical, halogen atoms, the trifluoromethyl radical, the nitro radical, alkylsulphonyl radicals having from 1 to 4 carbon atoms and the fused-on benzene ring, $R_3$ and $R_4$ are selected from the group consisting of alkyl radicals having from 1 to 4 carbon atoms, alkoxyl radicals having from 1 to 4 carbon atoms, the hydroxyl radical, halogen atoms, the trifluoromethyl radical, the nitro radical, alkylsulphonyl radicals having from 1 to 4 carbon atoms and the fused-on benzene ring, X represents a divalent atom selected from the group which consists of oxygen and sulphur, and $m$, $n$, $p$ and $q$ represent positive integers of from 1 to 2.

2. A compound having the general formula:

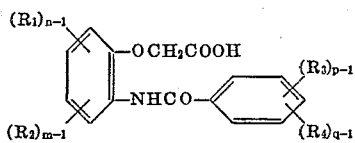

in which:
$R_1$, $R_2$, $R_3$ and $R_4$ are selected from the group consisting of alkyl radicals having from 1 to 4 carbon atoms, alkoxyl radicals having from 1 to 4 carbon atoms, the hydroxyl radical, halogen atoms and the trifluoromethyl radical, and $n$, $m$, $p$ and $q$ represent positive integers of from 1 to 2.

3. A compound having the general formula:

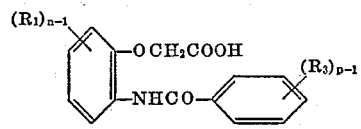

in which:
$R_1$ and $R_2$ are selected from the group consisting of alkyl radicals having from 1 to 4 carbon atoms, alkoxyl radicals having from 1 to 4 carbon atoms and halogen atoms, and $n$ and $m$ represent positive integers of from 1 to 2.

4. The compound 2 - (3',4' - dichlorobenzamido)-phenoxyacetic acid.

5. The compound 2 - (3',4' - dichlorobenzamido) - 4-methyl-phenoxyacetic acid.

6. The compound 2 - benzamido - 4 - chloro - phenoxyacetic acid.

References Cited

Organic Chemistry, vol. I, Finar, QD 251 F56 (Group 127), pages 752, 753 and 676 relied on.

LORRAINE A. WEINBERGER, *Primary Examiner.*

L. A. THAXTON, *Assistant Examiner.*